United States Patent
Braun et al.

(10) Patent No.: US 6,705,073 B2
(45) Date of Patent: Mar. 16, 2004

(54) GAS TURBINE PLANT AND PROCESS FOR LIMITING A CRITICAL PROCESS VALUE

(75) Inventors: Jost Braun, Waldshut-Tiengen (DE); Juergen Hoffmann, Rieden (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 10/068,866

(22) Filed: Feb. 11, 2002

(65) Prior Publication Data

US 2002/0178731 A1 Dec. 5, 2002

(30) Foreign Application Priority Data

Feb. 27, 2001 (DE) .......................... 101 09 430

(51) Int. Cl.[7] .............................................. F02C 7/143

(52) U.S. Cl. .................. 60/39.3; 60/39.53; 60/728

(58) Field of Search ............... 60/39.3, 39.53, 60/728

(56) References Cited

U.S. PATENT DOCUMENTS

| | | | | |
|---|---|---|---|---|
| 2,874,537 A | * | 2/1959 | Scarborough et al. | 60/39.53 |
| 2,974,482 A | * | 3/1961 | Kelley | 60/39.3 |
| 4,213,738 A | | 7/1980 | Williams | |
| 4,660,376 A | * | 4/1987 | Johnson | 60/39.53 |
| 5,463,873 A | | 11/1995 | Early et al. | |
| 5,758,485 A | | 6/1998 | Frutschi | |
| 6,012,279 A | | 1/2000 | Hines | |
| 6,260,350 B1 | * | 7/2001 | Horii et al. | 60/39.3 |

* cited by examiner

*Primary Examiner*—Michael Koczo
(74) *Attorney, Agent, or Firm*—Burns, Doane, Swecker & Mathis, L.L.P.

(57) ABSTRACT

A gas turbine plant includes at least one compressor compressing intake air, at least one component for heat supply heating the intake air compressed by the compressor, at least one gas turbine using as a working medium the hot air from the component for heat supply, and at least one generator coupled to the gas turbine. A cooling device is provided which permits the cooling of at least a portion of the intake air and/or a portion of partially compressed intake air within the at least one compressor.

17 Claims, 2 Drawing Sheets

GAS TURBINE PLANT AND PROCESS FOR LIMITING A CRITICAL PROCESS VALUE

FIELD OF THE INVENTION

The present invention relates to a gas turbine plant with regulated cooling of intake air or compressor air, and also a process for the operation of such a gas turbine plant.

BACKGROUND OF THE INVENTION

Stationary power stations are used for utility energy supply, and convert, according to constructional type, fossil, nuclear, or regenerative primary sources of energy into electrical current, which is fed into the power network for public or private energy supply. Because of the still unsolved problems in the use of regenerative energy sources (deficient availability, for example for wind power; low efficiency; and also, for nuclear power, the disposal of spent fuel elements), the use of fossil fuel sources—coal, petroleum, natural gas—is as always of great importance.

The use of gas turbines fired with natural gas or petroleum is particularly favorable for power generation in power plants. By the consistent use of cogeneration or the use of the arising waste heat as process heat, overall efficiencies of well above 50 percent are attained, which is by far the best value for the use of fossil energy sources. A problem, not to be underestimated, of this kind of plant is that the resulting main data (power and efficiency) have a strong dependence on the ambient temperature. This dependence on the ambient temperature is mostly opposed to the customers' requirements, in that the plants produce less current with poorer efficiency when the ambient temperatures are high.

Additional necessary protective or control measures can then be superimposed on this basic operating behavior. This is in case, for example, the relatively high temperatures at the compressor end or within the compressor, such as occur due to the high pressure ratios used today, are raised above a limiting value by a high intake temperature. High temperatures at these critical points lead to exceeding the thermal rating of the components there, so that individual component life values given by the manufacturer can no longer be guaranteed.

In the prior art, the temperature is generally limited by reducing the compressor end pressure, and thus the temperature, by suitable means. Since this is above all determined by the absorption capacity of the turbine, suitable measures consist only of a reduction of the intake amount and/or a reduction of secondary introduced material streams (e.g., water or steam into the combustion chamber), and/or a reduction of the inlet temperature into the turbine. All the measures, and also a combination of measures, lead to a further reduction of power and efficiency values of the plant, which diminishes the proper utility of the plant for the proprietor.

The so-called intercooling method is for example known in the prior art, in which the air stream between the booster and the high pressure compressor is cooled in order to reduce the temperature of the intake air. The cooling can take place here by means of heat exchangers or by injecting a cooling medium, e.g., water.

Thus, e.g., U.S. Pat. No. 6,012,279 describes such a process for the cooling of the partially compressed air between the low pressure compressor and the high pressure compressor by injecting water. This injection has the result that both the temperature of the air stream leaving the high pressure compressor, and also the temperature in the combustion chamber, are reduced.

U.S. Pat. No. 5,463,873 furthermore describes the evaporative cooling of the intake air of a gas turbine, in which the amount of the injected water is adjusted so that the saturation limit of water in the air stream of the turbine is not exceeded. Since such an injection cooling normally uses deionized water, which is expensive, for the protection of the gas turbine, the control is directed to avoiding condensation of water in the gas turbine in order to keep the costs low, and on the other hand, to keeping the pressure drop of the intake air to a minimum value, instead of injecting the optimum amount of water.

SUMMARY OF THE INVENTION

The invention is directed to a gas turbine plant, in particular a gas turbine power plant, a combined heat and power plant, or a cogeneration plant, with at least one compressor compressing intake air, at least one component heating the intake air compressed by the compressor, which component is in particular a combustion chamber or a catalyst, at least one turbine using as a working medium the hot air from the component for heat supply, and at least one generator coupled to the gas turbine, wherein cooling means are present which permit the cooling of at least a portion of the intake air and/or a portion of partially compressed intake air within the at least one compressor. The invention is also directed to a process for the operation of the above-described system. The invention ensures that the thermal rating of components at critical places in the air path of the gas turbine are not exceeded, and that simultaneously a cooling medium is used for the cooling of the intake air stream or else the air stream within the compressor or between different stages of compression. The system is operated as economically and optimally as possible, both in relation to the external conditions and also in relation to the internal gas turbine process.

U.S. Pat. No. 6,012,279 cannot achieve the results of this invention since the use of intercooling, or respectively the injection of water into the intake air path, or both in combination, is described without explaining how this injection or cooling is to be optimally effected in relation to external and also internal conditions.

U.S. Pat. No. 5,463,873 cannot achieve the results of this invention since only the adjustment of the injection to the saturation value in the intake air path is described, i.e., a control which regulates the injection to a value which is below the saturation limit of water in the working medium path.

The desired results are achieved by the present invention since the cooling means is designed such that under the usual conditions it is capable of cooling the intake air path of the gas turbine to the extent that critical temperature values at critical places are not exceeded; and the cooling means is directly driven in a controlled manner at critical places in dependence on the temperature values.

The invention is directed to a gas turbine plant in which the cooling means is suitable for cooling at least a portion of the air mass flow before or within the compressor such that the air temperature and/or component temperature at critical places does not exceed a prescribed maximum temperature predetermined by the component materials arranged at the critical places, and such that temperature measuring devices are arranged in the location of at least one of the critical places, their temperature measurements being used for specific regulation or control of the cooling means.

The invention thus provides a specific control of the cooling means. The control is optimized so that effectively the actual temperature values arising at the critical places are measured and used as control parameters. It is thus ensured that the cooling means is used only in the exactly necessary effective amount, i.e., only in relation to the extent actually required at the critical places. The use of the cooling means is minimized in this manner, or respectively the reduction of the overall efficiency of the gas turbine plant due to the cooling is kept to the minimum required value.

A first preferred embodiment of the gas turbine plant according to the invention is characterized in that for the specific regulation or control of the cooling means, it is not the temperature at one of the critical places which is measured, but another measurable quantity of the gas turbine process which represents an indirect measure of the prescribed maximum temperature value in the location of at least one of the critical places. In other words, it is also possible not to measure the temperature directly at the critical place, but to take another process value instead, which process value is however a determinable function of the temperature value at at least one of the critical places.

A further preferred embodiment has a low pressure compressor and a high pressure compressor, and preferably at least a portion of the partially compressed intake air issuing from the low pressure compressor is cooled by the cooling means. Furthermore the cooling means is preferably capable of sufficiently cooling the whole of the partially compressed intake air. The cooling means can however also or additionally be designed such that the whole of the intake air can be cooled.

A further preferred embodiment has, in addition, at least one waste heat boiler and furthermore, particularly preferred, at least one steam turbine, the waste heat boiler producing steam for operating the steam turbine from the hot exhaust gases leaving the gas turbine, and particularly preferred, with the gas turbine, generator and steam turbine all mounted on a common shaft. The above construction can, in other words, be useful for so-called single-shaft plants.

The cooling means can be provided in very different forms. On the one hand it is conceivable to provide a heat exchanger through which a cooled medium flows, the temperature of the coolant in or at the heat exchanger and/or the amount of the cooling medium being regulated by the heat exchanger for the limitation of the measured, predetermined temperature. However it is also possible to provide a surface-wetted evaporative cooler, the amount of water conducted over the surface of the cooler being controlled for the limitation of the measured temperature. Or there can be provided, alternatively or additionally, at least one nozzle as the cooling means, with which water or another suitable liquid, or else a liquid mixture, can be sprayed in in a finely divided state. In this case, the amount of water or liquid sprayed in by means of the nozzles can be controlled for the limitation of the measured temperature. Then particularly preferred, additionally to the cooling effect by evaporation, a temperature-reducing effect, which increases efficiency, of a wet cleaning of the compressor blades during operation can in addition be used regularly or even permanently, in that more water is regularly or permanently sprayed in intentionally than corresponds to the saturation limit of the air.

The following regions within the gas turbine plant are concerned, preferably but not exclusively, as the critical places: at the end of the compressor, in the compressor diffuser, in the plenum before entry into the first combustion chamber, at a place within the compressor, at an air bleeding place of the compressor, in the cooling system for turbine cooling, at the metal of the rotor, at the metal of the gas turbine housing, at the metal of the compressor blades, at the metal of the components of the combustion chamber. The compressor outlet is found to be particularly critical.

Furthermore, the present invention relates to a process for the operation of a gas turbine plant, as described hereinabove. In particular, in such a process, the temperature values measured at the critical places in such a process are supplied to a control unit (usually a computer) which in its turn then controls the cooling means. The control is in particular arranged such that the measurement assumes control which first reaches the maximum value allotted to it. Furthermore, the controlling means is preferably adjusted so that the cooling means is already controlled at a certain spacing, i.e., beneath the maximum value.

A particularly preferred embodiment of the process is characterized in that leading quantities are calculated indirectly from at least one, or from a combination, of several measurement values, particularly preferred in that the temperature is determined by a measurement of the compressor end pressure or intermediate pressure, if necessary in addition taking the ambient temperature into account, or in that the position of at least one adjustable compressor front guide row is used, if necessary taking additional account of the ambient temperature, in order to determine the operating state, i.e., a temperature estimation of the critical places.

BRIEF DESCRIPTION OF THE DRAWINGS

The invention will be described in detail hereinbelow using embodiment examples in combination with the accompanying drawings.

DETAILED DESCRIPTION OF THE PREFERRED EMBODIMENTS

Figure 1:
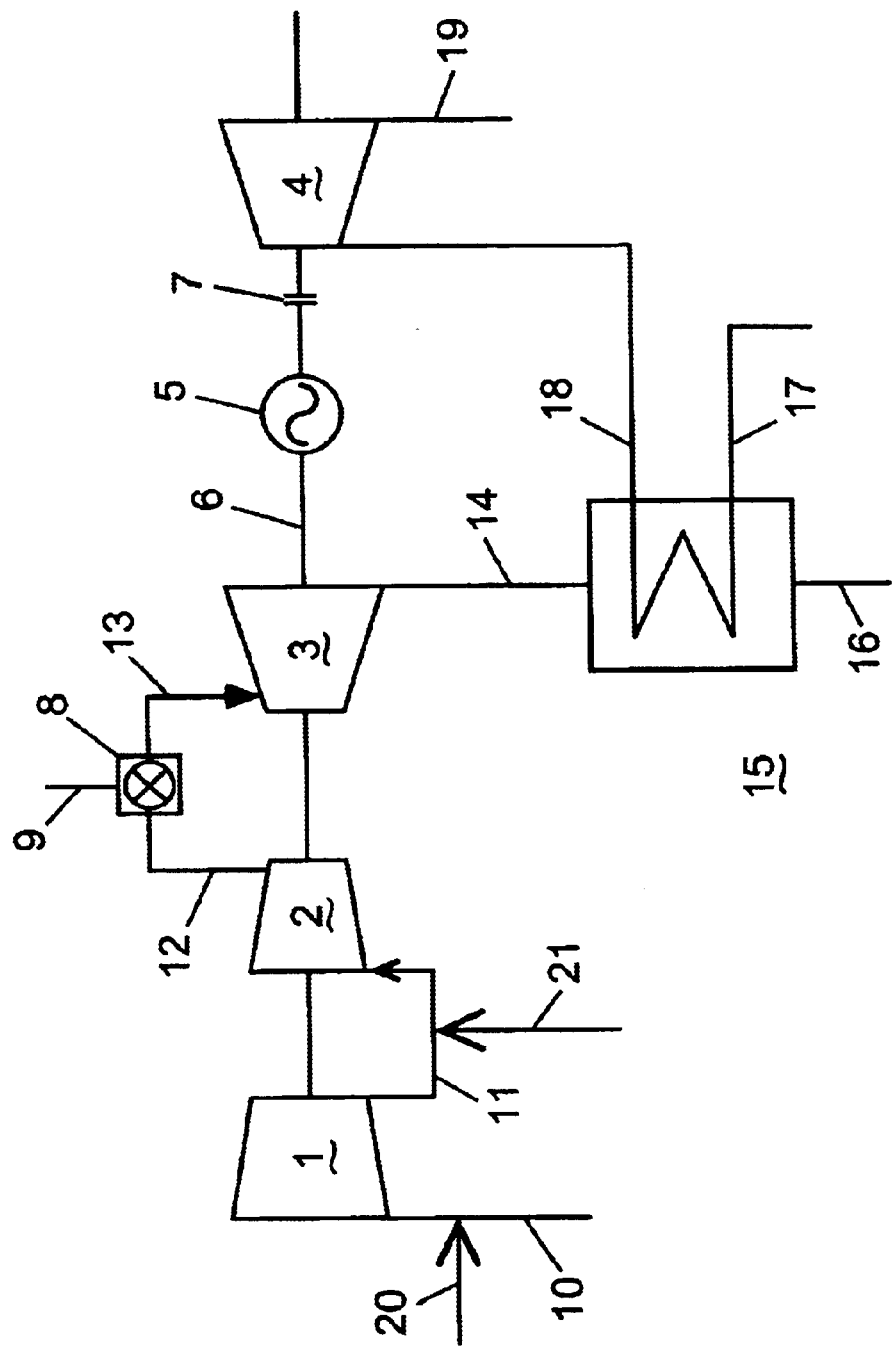
FIG. 1 is a diagram schematically showing a gas turbine plant with intake air cooling and/or compressor air cooling.

FIG. 1 shows a gas turbine plant in which atmospheric air, sucked in by means of the air intake 10, is compressed in a first stage in a low pressure compressor 1, and is then further compressed in a high pressure compressor 2. The compressed intake air 12 is then conducted to the combustion chamber 8. In the combustion chamber 8, the intake air is mixed with fuel supplied via the fuel supply 9, and the mixture is combusted. The combustion of liquid or gaseous fuels is concerned here, at a working temperature of typically over 1,000° C. It is also possible to provide a catalyst or a heat exchanger instead of the combustion chamber (8). In general, simply a component for heat supply can be provided. The hot combustion gas 13 is then supplied to the gas turbine 3 and expanded there. The exhaust gas 14 ejected from the gas turbine 3 is usually supplied to a waste heat boiler 15 before being emitted to the atmosphere via an outlet 16. The residual heat contained in the exhaust gas 14 is used in the waste heat boiler 15 for the production of steam for a steam turbine 4. This takes place in that water is conducted in a duct 17 to the waste heat boiler 15, the water is evaporated in the waste heat boiler 15 and the steam is supplied to the steam turbine 4 via a duct 18. The use of an additional steam turbine leads to a significant increase of the overall efficiency of the plant. In the plant shown in FIG. 1, a so-called single-shaft plant is concerned: that is, the compressors 1 and 2, gas turbine 3, steam turbine 4, and generator 5 are mounted on a common shaft 6. A coupling 7 allows the steam turbine 4 to be uncoupled from the other components.

In such a gas turbine plant, the gas turbine 3 today normally works, based on an optimized process efficiency, with a pressure ratio (highest occurring pressure to ambient pressure) at the design point above the value 13, or even above 30 with different gas turbine types. This can bring about air temperatures at the end of the compressor 2, and also at other critical places of the whole plant, in combination with the high pressure, of up to the load limits of the materials used (rotor components, housing, etc.). The thermal overloading of components present at the critical places leads to a dramatic fall in the life of such components, and the component life values given by the manufacturer can no longer be guaranteed. This case occurs above all when the temperature of the intake air is higher than at the design point of the gas turbine, thus generally during warm weather and in particular in climate zones with high average annular temperature. The effect can moreover be amplified by other measures, such as the usual water spraying into the combustion chamber for emission control when liquid fuels are burned, or water or steam spraying for an increase in power. In order to widen the operating region of the gas turbine, otherwise limited by such maximum permissible temperatures, a form of construction and a process are proposed here which make it possible to keep the temperature at the end of the compressor below the desired maximum value without limiting the power values of the gas turbine, such as would be brought about, for example according to the prior art, by a reduced intake amount on closing the front guide row.

FIG. 1 furthermore shows different ways of putting cooling of the intake air into effect. On the one hand it is possible to provide cooling means 20 for the atmospheric air sucked in by the low pressure compressor 1. Alternatively or additionally, it is possible to bring the partially compressed intake air 11 (the air path between the low pressure compressor 1 and the high pressure compressor 2) to a lower temperature with a cooling means 21. Already today various constructional types of cooling means are known. There can be used a heat exchanger through which a cooled medium flows, or an evaporative cooler in which the air flows through a large-surfaced, moistened material and is cooled evaporatively. Or else direct spraying of water or another medium with evaporative effect into the sucked-in air stream can be used. Furthermore, cooling processes on an electromagnetic basis, on a chemical basis, or another type, are also conceivable.

To optimize the power output of the gas turbine and of a possibly connected steam circuit, a control means is therefore proposed which controls this value over wide ranges of the region otherwise limited by the maximum temperature at the critical places, without the front guide row of the gas turbine having to be closed for limitation, and/or the fuel feed alone having to be reduced because of critical temperature values. Logically, the measurement and regulating process can of course be applied to other process quantities than temperature. These process quantities are however to then have a direct relation to the temperature at critical places, that is, have to represent a measure of these temperatures at critical places.

Figure 2:
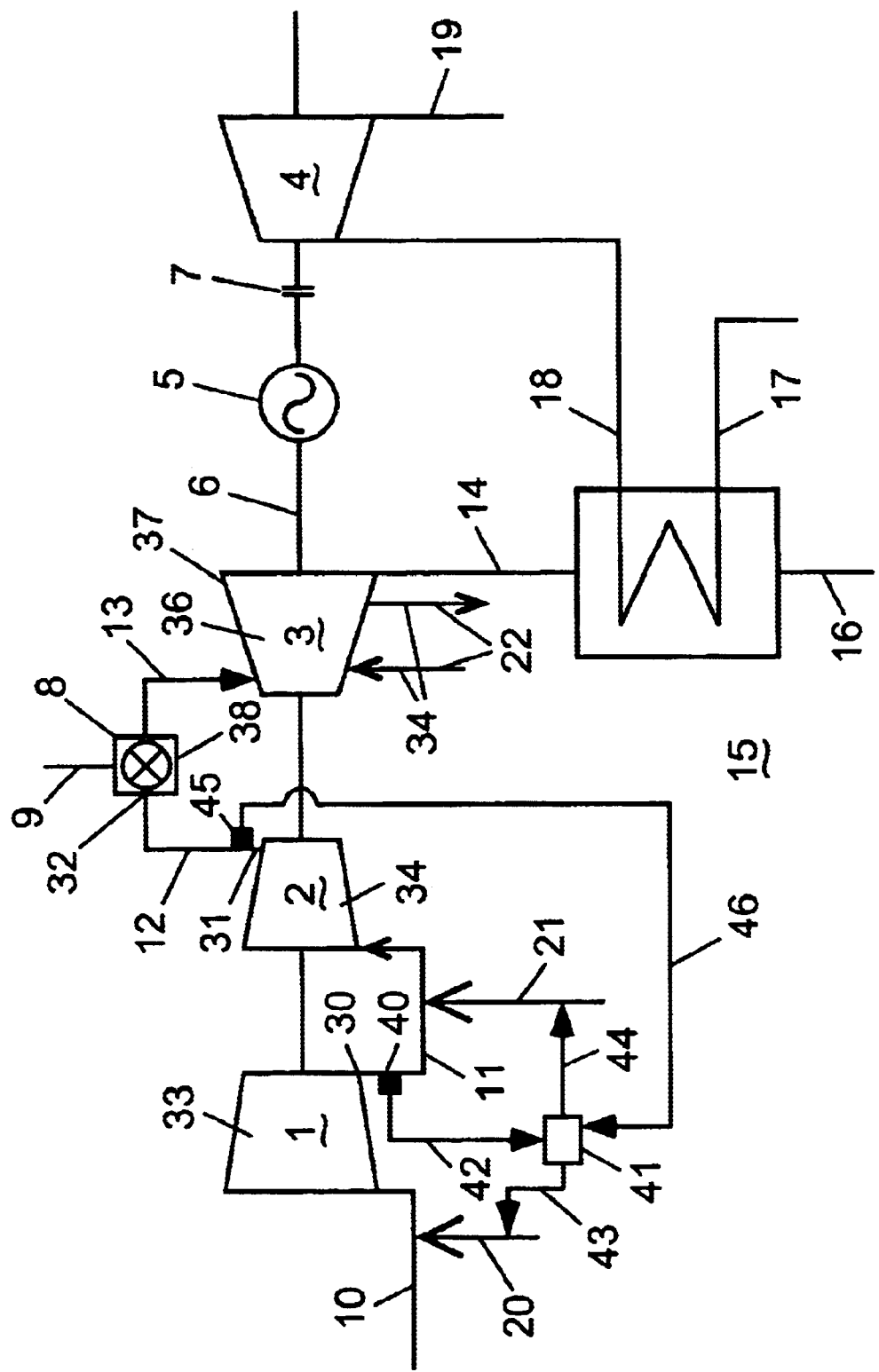
FIG. 2 is a diagram schematically showing a gas turbine plant with controllable intake air cooling and/or compressor air cooling.

FIG. 2 now shows how a regulation of the cooling means 20 and 21 can take place according to the invention. The critical places, at which critical temperatures can occur within such a plant, i.e., temperatures at which the components of the plant reach the thermal load limit, are: the end of the low pressure compressor 30; the end of the high pressure compressor 31; the plenum before entry into the first combustor 32; components in the low pressure compressor 1, in the high pressure compressor 2, in the cooling system 22 for gas turbine cooling, or in the gas turbine 3; but also components of the housing of the gas turbine 37, of the combustion chamber 8; or other components which hot gas flows through or past.

A temperature measurement point is now preferably provided at at least one, but preferably at several or each of the places limited by a permissible maximum temperature, the temperature of which is not primarily determined by the temperature of the hot gases after the combustion, which temperature measurement point can be single according to the required control design, but can likewise be embodied as redundant. In principle, another suitable process quantity can be also used for control instead of the temperature and the temperature measurement, as long as this process quantity responsibly portrays the temperature at the critical places indirectly.

For example, it is shown in FIG. 2 how the temperature value at the outlet from the low pressure compressor 1 is measured at a measurement point 40 and used for control. For this purpose, the temperature signal 42 is supplied to a control unit 41. The control unit 41, usually a computer, processes the signal 42 and uses it to control the cooling means 20 and 21 via the leads 43 and 44. As already mentioned hereinabove, numerous temperature measurement points can preferably be used, and all the measured temperature signals can be supplied to a single control unit 41, which then controls the cooling means 20 and 21 as a function of all the values. For example, in addition to measuring the temperature value at the outlet of the low pressure compressor 1, the temperature value at the outlet of the high pressure compressor 2 can be measured at a measurement point 45 and the temperature signal 46 can be supplied to the control unit 41. It is found to be particularly appropriate to allow that measurement to assume control which first reaches the maximum value of the temperature allotted to it. Furthermore, in order to attain a smoothed control behavior which prevents overshoot behavior, the control of the cooling means 20, 21 is already to be set at a certain distance, that is, set respectively below the permissible maximum value.

The control of the cooling means 20, 21 is then to be set by the control unit 41 so that it is set, until a fixed maximum value is attained, after presetting the desired reference power of the plant, and, after reaching this maximum temperature value, the cooling effect is however controlled such that the maximum temperature value is not exceeded, and that only when the cooling effect of the cooling means 20, 21 is no longer sufficient for cooling the critical places, other processes are used which reduce the power.

The process can likewise be used for gas turbines in closed circuit, in that the cooling power of the heat exchanger after exit from the turbine and before re-entry into the compressor is controlled corresponding to the proposed process. In place of the combustion chamber, a heat supply enters here, e.g. a heat exchanger, which supplies the process with energy by means of an external heat supply.

What is claimed is:

1. A gas turbine plant, comprising:
   at least one compressor for compressing intake air;
   at least one component that supplies heat for heating the air compressed by the compressor;

at least one gas turbine using as a working medium hot gas from the at least one component for heat supply;

at least one generator coupled to the at least one gas turbine, cooling means for cooling at least a portion of the intake air, wherein the cooling means is suitable for cooling at least a portion of intake air mass flow before the at least one compressor such that at least one of the air temperature and component temperature at critical places within the at least one gas turbine does not exceed a prescribed maximum temperature predetermined by the component materials arranged at the critical places, wherein temperature measuring devices are arranged at the location of at least one of the critical places, the temperature measurement values measured by the temperature measuring devices being used for specific regulation or control of the cooling means;

and a control unit to which the temperature measurement values are supplied, and which control unit outputs control signals for the control of the cooling means, and two or more measuring devices used in combination in the control, wherein the temperature measurement value that first reaches the prescribed maximum value controls the control unit.

2. The gas turbine plant according to claim 1, wherein the at least one component for heat supply is at least one of a combustion chamber, a catalyst and a heat exchanger.

3. The gas turbine plant according to claim 1 or claim 2, wherein the temperature measurement device determines a measurable quantity of the gas turbine process which represents an indirect measure of the prescribed maximum temperature value in the location of at least one of the critical places is used for specific regulation or control of the cooling means rather than the temperature at one of the critical places.

4. The gas turbine plant according to claim 1, wherein at least a portion of the compressed or partially compressed intake air is bled off and is cooled by cooling means.

5. The gas turbine plant according to claim 1, wherein said at least one compressor includes a low pressure compressor and a high pressure compressor, and at least one portion of partially compressed intake air leaving the low pressure compressor is cooled by cooling means.

6. The gas turbine plant according to claim 1, wherein said cooling means allows cooling of all of the intake air.

7. The gas turbine plant according to claim 1, wherein at least one waste heat boiler is furthermore arranged for recouping heat.

8. The gas turbine plant according to claim 7, further including at least one steam turbine, the waste heat boiler producing steam with the exhaust gases leaving the at least one gas turbine for the operation of the steam turbine, and the at least one gas turbine, the at least one generator, and the at least one steam turbine are mounted on a common shaft.

9. The gas turbine plant according to claim 1, wherein the cooling means is a heat exchanger through which a cooling medium flows, and at least one of the temperature of the cooling medium in or at the heat exchanger and the amount of the cooling medium passing through the heat exchanger are controlled for the limitation of the measured temperature.

10. The gas turbine plant according to claim 1, wherein a surface-wetted evaporative cooler is provided as the cooling means, and the amount of water conducted over the surface of the cooler is controlled for the limitation of the measured temperature.

11. The gas turbine plant according to claim 1, wherein at least one nozzle is provided as the cooling means, with which nozzle water or another suitable liquid, or a liquid mixture, is sprayed in a finely-divided state to directly or indirectly control the temperature measurement values.

12. The gas turbine plant according to claim 11, wherein the at least one nozzle is adjusted for the limitation of the measured temperature, and in addition to a cooling effect by evaporation, the nozzle produces a temperature-reducing effect of a wet cleaning of the compressor blades during operation by regularly or permanently spraying in intentionally more water or liquid than corresponds to the saturation limit of the air.

13. The gas turbine plant according to claim 1, wherein the temperature measuring devices permit temperature measurement alternatively or simultaneously in the location of at least two of the compressor ends, in the compressor diffuser, in the plenum before entry into the first combustion chamber, at a place within the compressor, at an air bleeding place of the compressor, in the cooling system for turbine cooling, on the metal of the rotor, on the metal of the housing of the gas turbine, on the metal of the blading of the compressor, on the metal at components of the combustion chamber, on the metal of the blading and in the hot gas channel of at least one turbine.

14. The gas turbine plant according to claim 1, wherein the control of the cooling means is used at a predetermined difference from the prescribed maximum temperature value.

15. The gas turbine plant according to claim 1, wherein the temperature values used for control are indirectly calculated from at least one of measured temperature measurement values.

16. The gas turbine plant according to claim 15, wherein the temperature measurement values are determined by means of a measurement of the compressor end pressure or intermediate pressure, taking into account the ambient temperature.

17. The gas turbine plant according to claim 15, wherein the temperature measurement values are determined using the position of at least one adjustable compressor front guide row and taking into account the ambient temperature, in order to determine the operating state at the critical places.

* * * * *